US006950475B1

(12) United States Patent
Lewis

(10) Patent No.: US 6,950,475 B1
(45) Date of Patent: Sep. 27, 2005

(54) OFDM RECEIVER CLOCK SYNCHRONIZATION SYSTEM

(75) Inventor: Michael E. Lewis, Hartville, OH (US)

(73) Assignee: Cisco Technology, Inc., San Jose, CA (US)

( * ) Notice: Subject to any disclaimer, the term of this patent is extended or adjusted under 35 U.S.C. 154(b) by 619 days.

(21) Appl. No.: 10/006,035

(22) Filed: Dec. 5, 2001

Related U.S. Application Data

(63) Continuation of application No. 09/734,261, filed on Dec. 11, 2000.

(51) Int. Cl.$^7$ .............................................. H04K 1/10

(52) U.S. Cl. ..................... 375/260; 375/354; 375/355; 375/366; 370/203; 370/208; 455/63

(58) Field of Search ................................ 375/219, 260, 375/326, 365, 354, 355, 364, 366; 370/203, 370/208; 455/65

(56) References Cited

U.S. PATENT DOCUMENTS

| 5,852,630 | A | * | 12/1998 | Langberg et al. ............ 375/219 |
| 6,111,919 | A | * | 8/2000 | Yonge, III ................... 375/260 |
| 6,654,339 | B1 | * | 11/2003 | Bohnke et al. .............. 370/203 |
| 6,754,170 | B1 | * | 6/2004 | Ward ........................... 370/208 |
| 2002/0065047 | A1 | * | 5/2002 | Moose | |

* cited by examiner

Primary Examiner—Shuwang Liu
(74) Attorney, Agent, or Firm—Tucker Ellis & West LLP

(57) ABSTRACT

A method is disclosed for synchronizing a OFDM signal. The method includes receiving an OFDM signal including a plurality of long and short synchronization symbols, each comprising a plurality of points. The method includes correlating a predetermined number of points in a long symbol of the received OFDM signal against corresponding points in a reference symbol. A correlation peak is obtained between the received long symbol and the reference symbol, wherein the peak occurs at the time when the receiver has clock synchronization.

38 Claims, 2 Drawing Sheets

Integration of the N-point cross correlator into the OFDM symbol synchronizer.

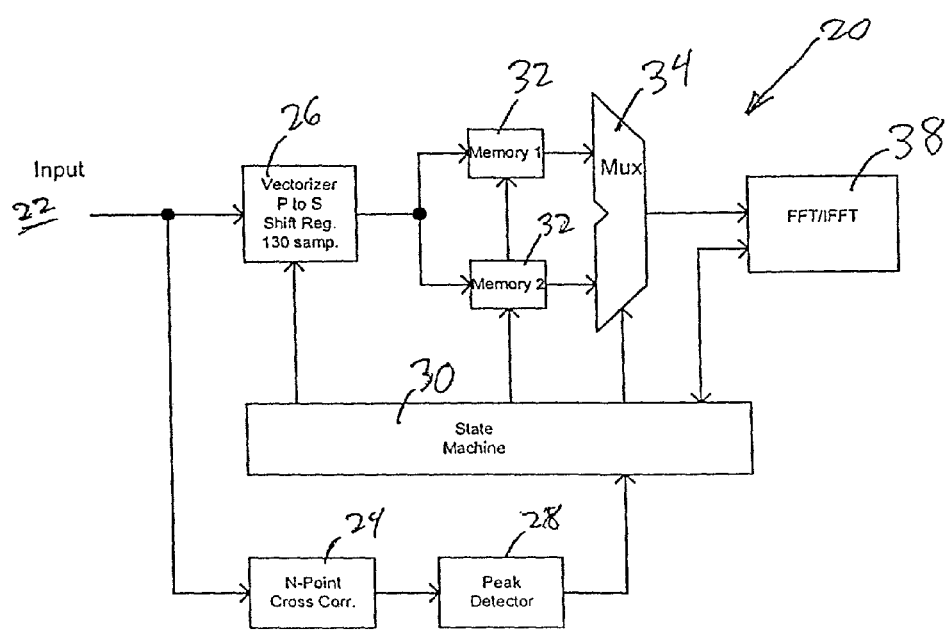
Figure 2. Integration of the N-point cross correlator into the OFDM symbol synchronizer.

OFDM RECEIVER CLOCK SYNCHRONIZATION SYSTEM

This application is a continuation of application Ser. No. 09/734,261 filed Dec. 11, 2000.

BACKGROUND OF THE INVENTION

The present invention is directed to the field of wireless digital communications. With the recent proliferation of wireless communications, there is an increasing demand for wireless traffic, resulting in increasing channel interference. Consequently, a number of modulation schemes are employed to efficiently utilize the limited frequency spectrum. Such schemes require precise synchronization between the receiver and transmitter in order to decode the signal for extracting the transmitted data.

A well known method of receiver synchronization is to simultaneously transmit a synchronization signal along with the transmitted data. However, such a synchronization signal wastes bandwidth and is susceptible to distortion in the same manner as the transmitted signal. Consequently, it is desirable to recover the synchronization parameters at the receiver directly from the transmitted signal.

Orthogonal frequency division multiplex (OFDM) modulation is a multicarrier modulation method in which several subcarriers are modulated with the desired information. These subcarriers are then simultaneously transmitted by the transmitter. The frequency relationship between the various subcarriers is such that they are orthogonal in the mathematical sense, permitting the receiver to recover the data from each subcarrier. This method allows excellent synchronization, along with excellent bandwidth utilization and performs well in multipath radio frequency (RF) environments.

OFDM modulation suffers from certain drawbacks. Of particular concern is OFDM burst operation at very high data rates. In this case it is very difficult to rapidly synchronize the receiver to the transmitter. Usually, the longer the synchronization sequence the better the quality of synchronization. This however is contrary to the goal of transmitting at high data rates, i.e. sending a large amount of data in a very short time, since the synchronization time is wasted with regard to data transfer. The shorter the synchronization time the better.

Another concern is the latency introduced by synchronization. Latency in high rate OFDM transmission can cause a serious problem when it increases to such an extent that it takes an excessive time to synchronize to and decode the received data. In particular there are specific cases within the IEEE 802.11a standard where very short turn around times are required. (The turn around time is the time difference between a received message and the reply.) There are several processes that introduce significant amounts of latency; data interleaving and convolution/block code decoding. These processes are required and it is difficult to reduce their inherent latencies. Thus it is necessary that the initial synchronization be rapid and robust while incurring no loss in synchronizer performance. This presents a difficult task since better synchronizer performance is achieved with both longer synchronization sequences and latency (i.e. more time to analyze the synchronization sequence), both of which are contrary to the needs in a high data rate OFDM communication system.

BRIEF DESCRIPTION OF THE INVENTION

In view of the difficulties and drawbacks of high data rate OFDM communications, there is therefore a need for an OFDM synchronization method that provides rapid, reliable, robust synchronization. There is also a need for determination of initial data clock or frame synchronization. It is this aspect of OFDM synchronization that is addressed herein.

The above needs and others mentioned herein are satisfied by the method of the present invention for OFDM frame synchronization. The method includes receiving an OFDM signal including a plurality of short and long synchronization symbols at the beginning of the OFDM frame each comprising a plurality of points. The method includes cross-correlating a predetermined number of points in a long symbol of the received OFDM signal against corresponding points stored in the receiver. The points stored in the receiver consist of the first 16 to 64 points of the long synchronization symbol. A correlation peak is obtained when the same 16 to 64 points of the transmitted synchronization symbol are lined up with those in the receiver. At this point one can identify where in the OFDM frame the receiver timing is located. If this time is stored, one has frame synchronization as well as initial data clock synchronization.

As will be realized, the invention is capable of other and different embodiments and its several details are capable of modifications in various respects, all without departing from the invention. Accordingly, the drawing and description are to be regarded as illustrative and not restrictive.

BRIEF DESCRIPTION OF THE DRAWINGS

FIG. 2 shows a preferred hardware implementation for obtaining OFDM frame and initial clock synchronization in accordance with the present invention.

DETAILED DESCRIPTION OF THE INVENTION

Figure 1:
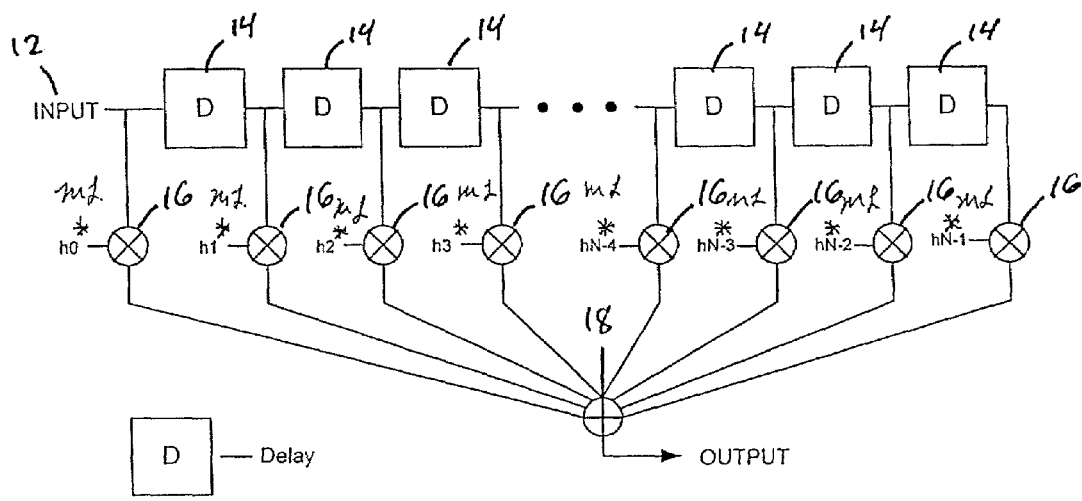
FIG. 1 shows a cross correlator used to obtain OFDM frame and initial clock synchronization in accordance with the present invention.

Specifically, an OFDM symbol is created and decoded in the following manner. The following is a description of the creation and detection of an OFDM symbol as defined by the IEEE 802.11a standard. The data of interest is received at the input to the transmitter and gathered into groups of n-bits which are then mapped to the appropriate quadrature amplitude modulated (QAM) symbol which itself is a complex number (real+imaginary) each component of which is m-bits wide. The data is continued to be gathered into groups of n-bits and mapped to QAM symbols. This continues until N-QAM symbols have been generated. These N-QAM symbols are understood to be the amplitudes of N subcarriers. For example, assume that N is 48. Further assume that there are 4 subcarriers that are used as pilot tones to be used for frequency synchronization. Add to these 52 subcarriers 12 more subcarriers with zero amplitude. Apply these 64 subcarrier amplitudes to an inverse Fast Fourier Transform (FFT) block to compute the 64-point complex time sequence corresponding to the 64 complex subcarrier amplitudes. Prepend to this 64 point time sequence the last 16 points in the original 64 point time sequence. This prefix is called the cyclic prefix. This 80 point sequence (the OFDM symbol) is then transmitted, each point presented to the output at intervals of 50 ns. This time sequence is received by the receiver which discards the 16 points in the cyclic prefix and then presents the remaining 64 points to a forward FFT. The output of this forward FFT consists of the original 48 data subcarriers, 4 pilot tone subcarriers and 12 zero subcarriers. The amplitudes of the 48 data subcarriers, which themselves are complex QAM symbols, are changed into their equivalent n-bit data sequence.

For the OFDM signal to be demodulated the receiver must recover the phase and frequency of both the transmitter data clock and carrier. Synchronization is achieved in several ways, the specific method being determined by the application. For example, continuous streaming data is best synchronized using methods that employ the continuous presence of the transmitted signal. In high speed burst transmission the data is present for only a short time and must be synchronized rapidly to prevent either loss of data or excessive delay in decoding the data burst. In this case it is necessary to include in the transmitted data special sequences which are used for synchronization. These special synchronization sequences are known to both the transmitter and receiver and appear at specific times within the transmitted data sequence. This enables the receiver to anticipate when a synchronization sequence will be present. In burst transmission these special sequences appear at the beginning of the transmission. Additionally, short special synchronization sequences may also be interspersed within the data sequence as well.

A complete OFDM symbol as it is transmitted over the radio channel is, $$s(t) = \text{Re}\left\{ \sum_{i=-\frac{N_s}{2}}^{i=\frac{N_s}{2}-1} d_{i+N_s/2} \exp\left( j2\pi \left( f_c - \frac{i+0.5}{T_s} \right)(t-t_0) \right) \right\}, t_0 \leq t \leq t_0 + T_s$$

S(t)=0, t<t_0^t>t_0+T_s
Where
$N_s$=number of subcarriers, an even number
$T_s$=OFDM symbol duration
$f_c$=carrier frequency
$d_i$=complex QAM symbol
$t_0$=initial time
The baseband equivelant expression is $$s(t) = \sum_{i=-\frac{N_s}{2}}^{\frac{N_s}{2}-1} d_{i+N_s/2} \exp\left( j2\pi \frac{i}{T}(t-t_0) \right), t_0 \leq t \leq t_0 + T_s$$

s(t)=0, t<t_0^t>t_0+T_s

From the above equation it is seen that the data stream is mapped to complex QAM symbols, d(i+Ns/2) which then undergo an inverse FFT to create a time sequence of N points. Reception is simply the inverse of this i.e. taking the forward FFT of the previous time sequence.

The IEEE 802.11a OFDM standard specifies for synchronization a sequence of ten short symbols followed by two long symbols. These long symbols are created by concatenating two 64 point inverse FFT's and prepending the last 32 points of this sequence to the beginning of the two concatenated 64 point inverse FFT's. This results in a long symbol with 160 points. Data immediately follows the last long synchronization symbol. Note also, that before the beginning of the $64^{th}$ point in the first long symbol, the receiver must have symbol and carrier synchronization to prevent any latency in calculating the channel response from the two long synchronization symbols which in turn would delay the processing of the data portion of the symbol.

With the present invention, it has been discovered that OFDM symbol synchronization can be effected by cross correlating the first 16 to 64 points of the first long synchronization symbol, and not incur any symbol synchronization latency. The method is also very robust even in strong multipath RF environments when 32 or more points are used.

In operation the receiver has a copy of the first 16 to 64 points of the long synchronization symbol which it cross correlates with the received long synchronization symbol.

A selected symbol includes a plurality of points. A predetermined number of these points are used to correlate against the same corresponding points stored in the receiver. The OFDM signal is detected by the receiver, and the respective subcarrier frequencies are demodulated into the plurality of points preferably by the forward FFT as stated above.

A configuration for preferred correlator 10 is shown in FIG. 1. The correlator input 12 receives the time sequences of the OFDM symbol. A plurality of delays 14 are provided so that a predetermined number of the time-sequenced points are processed in parallel by the correlator 10. Each predetermined point in the long symbol is forwarded to a respective tap 16 where it is multiplied by the corresponding point stored in the receiver. As can be seen from the figure, a predetermined number N of points can be selected. Preferably, the predetermined number of points is in a range between 16 and 64 points, depending on the desired quality of the correlation signal and the amount of multipath present in the RF environment.

As seen in the figure, $h_i$ is a coefficient representing the i'th tap 16. At each tap 16, the respective point of the received symbol is preferably multiplied by the point stored in the receiver, so as to obtain a respective number of multiplication products. These products are added together, preferably at a summation gate 18, the output of which represents a correlation signal. If the received time sequence is lined up with the sequence in the receiver as shown in FIG. 2 the output of the correlator has a maximum magnitude. All other alignments have very small outputs. This permits one to determine the beginning of the long OFDM synchronization symbol and hence achieve symbol synchronization.

A hardware implementation for providing initial OFDM clock synchronization using the above method is shown in FIG. 2. A receiver component 20 is shown which is the portion of the receiver that is relevant to clock synchronization. The digitized, received data enters at the input and is presented to both the N-point cross correlator 24 and the vectorizer 26. The vectorizer 26 is preferably a large serial-to-parallel shift register. Data is serially shifted into the vectorizer 26, while data is taken out in blocks of 64. (Note that the data paths are complex implying real and imaginary parts known as the I and Q signals in our case.)

The output of the N-point cross correlator is sent into a peak detector 28 which outputs a signal indicating that it has detected the main N-point correlation peak. This signal is detected by the state machine 30 which sends a signal to both the vectorizer 26 and the memories 32 (1 or 2) and the correct group of 64 points from the vectorizer 26 are latched into the appropriate memory 32. The output of the peak detector 28 also starts a modulo 80 counter in the state machine that is used to generate all subsequent clock signals to the vectorizer and memories 32 to clock in the appropriate group of 64 points for each subsequent OFDM symbol. These memory outputs are multiplexed with the multiplexer or "Mux" 34 and Fast Fourier Transform operations are performed with the FFT/IFFT 36. The present receiver component 20 can be realized by an application-specific integrated circuit, a digital signal processor, a computer program product, or any other hardware description of an algorithm, as would occur to those having skill in the art.

As described hereinabove, the present invention solves many problems associated with previous type methods. However, it will be appreciated that various changes in the details, materials and arrangements of parts which have been herein described and illustrated in order to explain the nature of the invention may be made by those skilled in the area within the principle and scope of the invention will be expressed in the appended claims.

I claim:

1. A method of synchronization of OFDM signal comprising:
   receiving an OFDM signal including a plurality of long and short synchronization symbols, wherein at least one of the plurality of long short synchronization symbols includes a predetermined plurality of time sequenced points;
   correlating the predetermined plurality of time sequenced points in the at least one of the plurality of long and short synchronization symbols of the received OFDM signal against corresponding predetermined plurality of points in a reference symbol stored at the receiver;
   obtaining a correlation peak between the at least one of the plurality of long and short synchronization symbols and the reference symbol, wherein the peak occurs at the time when the receiver acquires symbol synchronization between the predetermined plurality of time sequenced points in the at least one of the plurality of long and short synchronization symbols and the plurality of points in the reference signal stored at the receiver.

2. The method of claim 1 wherein the at least one of the plurality of long and short synchronization symbols is a long symbol and the number of the predetermined plurality of time sequenced points is in a range of between 16 and 64 points.

3. The method of claim 2, wherein the long symbol is the first long synchronization signal.

4. The method of claim 3, wherein the number of the predetermined plurality of time sequences points is at least 32.

5. The method of claim 1 further including the step of demodulating the OFDM signal's frequencies into the plurality of time sequenced points.

6. The method of claim 5 wherein the step of demodulating comprises applying a forward FFT to the signal, and the plurality of points applied to the forward FFT are points in a time sequence which is generated by applying an inverse FFT to the amplitudes of the plurality of subcarriers.

7. The method of claim 1 wherein the step of correlating includes multiplying each point of the at least one of the plurality of long and short synchronization symbols by the corresponding predetermined points in the reference symbol to obtain a respective number of multiplication products.

8. The method of claim 7 wherein the step of obtaining a correlation peak comprises adding all the multiplication products into a correlation signal.

9. The method of claim 1, the obtaining a correlation peak further comprises starting a counter to generate a clock signal for a subsequent OFDM symbol when the peak occurs.

10. A computer usable medium having computer readable program code embodied therein for causing synchronization of an OFDM signal, the computer readable program code into computer program product comprising:
   instructions for receiving an OFDM signal including a plurality of long and short synchronization symbols wherein at least one of the plurality of long short synchronization symbols includes a predetermined plurality of time sequenced points;
   instructions for correlating the predetermined plurality of time sequenced points in the at least one of the plurality of long and short synchronization symbols of received OFDM signal against corresponding predetermined plurality of points in a reference symbol stored at the receiver;
   instructions for obtaining a correlation peak between the at least one of the plurality of long and short synchronization symbols and the reference symbol, wherein the peak occurs at the time when the receiver acquires symbol synchronization between the predetermined plurality of time sequenced points in the at least one of the plurality of long and short synchronization symbols and the plurality of points in the reference signal stored at the receiver.

11. The computer program product of claim 10 wherein the the at least one of the plurality of long and short synchronization symbols is a long symbol and the number of the predetermined plurality of time sequenced points is in a range of between 16 and 64 points.

12. The computer program product of claim 10 further including instructions for demodulating the OFDM signal's frequencies into the plurality of time sequenced points.

13. The computer program product of claim 12 wherein the instructions for demodulating comprise instructions for applying an inverse Fast Fourier Transform to the signal, and the plurality of points are time sequences of the frequencies.

14. The computer program product of claim 10 wherein the instructions for correlating include instructions for multiplying each point of the at least one of the plurality of long and short synchronization symbols by the corresponding predetermined points in the reference symbol to obtain a respective number of multiplication products.

15. The computer program product of claim 14 wherein the instructions for obtaining a correlation peak comprise instructions for adding all the multiplication products into a correlation signal.

16. A receiver component for synchronization an OFDM signal comprising:
   an input for receiving an OFDM signal including a plurality of long and short synchronization symbols, wherein at least one of the plurality of long and short synchronization symbols includes a predetermined plurality of time sequenced points;
   a correlator for correlating the predetermined plurality of time sequenced points in the at least one of the plurality of long and short synchronization symbols of the received OFDM signal against corresponding predetermined plurality of points in a reference symbol stored at the receiver; and
   a peak detector for obtaining a correlation peak between the at least one of the plurality of long and short synchronization symbols and the reference symbol, wherein the peak occurs at the time when the receiver acquires symbol synchronization between the predetermined plurality of time sequenced points in the at least one of the plurality of long and short synchronization symbols and the plurality of points in the reference signal stored at the receiver.

17. The receiver component of claim 16 wherein the number of time sequenced points is in a range of between 16 and 64 points.

18. The receiver component of claim 16 further including means for demodulating the OFDM signal's frequencies into the plurality of time sequenced points.

19. The receiver component of claim 18 wherein the means for demodulating comprises means for applying a forward FFT to the signal, and the plurality of points applied to the forward FFT are points in a time sequence which is generated by means for applying an inverse FFT to the amplitudes of the plurality of subcarriers.

20. The receiver component of claim 16 wherein the correlator includes means for multiplying each point of the at least one of the plurality of long and short synchronization symbols by the corresponding predetermined points in the reference symbol to obtain a respective number of multiplication products.

21. The receiver component of claim 20 wherein the step of obtaining a correlation peak comprises means for adding all the multiplication products into a correlation signal.

22. The receiver component of claim 16 wherein the receiver component comprises at least one of: an application-specific integrated circuit; a digital signal processor; and a hardware description of an algorithm.

23. The receiver component of claim 16, further comprising:
a vectorizer coupled to the input for receiving the OFDM signal.

24. The receiver component of claim 23, wherein the vectorizer is a serial-to-parallel shift register.

25. The receiver component of claim 23, further comprising:
a counter coupled to the peak detector, wherein the counter is responsive to the peak detector to start a count sequence when the receiver acquires symbol synchronization, the count sequence providing clocking signals to the vectorizer for a subsequent OFDM signal.

26. The receiver component of claim 25, wherein the counter is a modulo 80 counter.

27. The receiver component of claim 25, further comprising:
at least one memory coupled to the vectorizer, wherein the counter provides clocking signals to the at least one memory for a subsequent OFDM signal.

28. The receiver component of claim 16, further comprising:
a vectorizer coupled to the input for receiving the OFDM signal, the vectorizer receiving a clocking signal from the counter, wherein the vectorizer is a serial-to-parallel shift register;
a counter coupled to the peak detector, wherein the counter is responsive to the peak detector to start a count sequence when the receiver acquires symbol synchronization, the count sequence providing clocking signals to the vectorizer for a subsequent OFDM signal, wherein the counter is a modulo 80 counter; and
at least one memory coupled to the vectorizer, wherein the counter provides clocking signals to the at least one memory.

29. The receiver component of claim 28, wherein the predetermined plurality of points in the reference signal correspond to a plurality of time sequenced points in a first long synchronization symbol of the plurality of long and short synchronization symbols.

30. The receiver component of claim 29, wherein the number of the plurality of points in the reference signal is between 16 and 64.

31. The receiver component of claim 29, wherein the number of the plurality of points in the reference signal is at least 32.

32. The receiver component of claim 29, wherein the clocking symbols are employed for shifting symbols from the vectorizer to the at least one memory.

33. An apparatus for causing synchronization of an OFDM signal comprising:
means for receiving an OFDM signal including a plurality of long and short synchronization symbols, wherein at least one of the plurality of long and short synchronization symbols includes a predetermined plurality of time sequenced points;
means for correlating the predetermined plurality of time sequenced points in the at least one of the plurality of long and short synchronization symbols of the received OFDM signal against corresponding predetermined plurality of points in a reference symbol stored at the receiver;
means for obtaining a correlation peak between the at least one of the plurality of long and short synchronization symbols and the reference symbol, wherein the peak occurs at the time when the receiver acquires symbol synchronization between the predetermined plurality of time sequenced points in the at least one of the plurality of long and short synchronization symbols and the plurality of points in the reference signal stored at the receiver.

34. The apparatus of claim 33 wherein the at least one of the plurality of long and short synchronization symbols is a long symbol and the number of predetermined plurality of time sequenced points is in a range of between 16 and 64 points.

35. The apparatus of claim 33 further including means for demodulating the OFDM signal's frequencies into the plurality of time sequenced points.

36. The apparatus of claim 35 wherein the means for demodulating comprises means for applying an inverse Fast Fourier Transform to the signal, and the plurality of time sequenced points are time sequences of the frequencies.

37. The apparatus of claim 33 wherein the means for correlating include means for multiplying each point of the at least one of the plurality of long and short synchronization symbols by the corresponding predetermined points in the reference symbol to obtain a respective number of multiplication products.

38. The apparatus of claim 37 wherein the means for obtaining a correlation peak comprises means for adding all the multiplication products into a correlation signal.

* * * * *